US010410197B2

(12) United States Patent
Yoshizawa

(10) Patent No.: US 10,410,197 B2
(45) Date of Patent: Sep. 10, 2019

(54) TAX CALCULATION APPARATUS, TAX CALCULATION METHOD, AND STORAGE MEDIUM STORING PROGRAM

(71) Applicant: CASIO COMPUTER CO., LTD., Shibuya-ku, Tokyo (JP)

(72) Inventor: Hiroaki Yoshizawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 155 days.

(21) Appl. No.: 15/457,596

(22) Filed: Mar. 13, 2017

(65) Prior Publication Data
US 2018/0005212 A1   Jan. 4, 2018

(30) Foreign Application Priority Data

Jun. 30, 2016   (JP) .................................. 2016-131122

(51) Int. Cl.
*G06Q 20/20*   (2012.01)

(52) U.S. Cl.
CPC ......... *G06Q 20/207* (2013.01); *G06Q 20/209* (2013.01)

(58) Field of Classification Search
CPC ..................... G06Q 20/207; G06Q 20/209
See application file for complete search history.

(56) References Cited

U.S. PATENT DOCUMENTS

| 5,630,071 | A | * | 5/1997 | Sakai | ................ | G06Q 20/202 |
| | | | | | | 705/21 |
| 5,774,872 | A | * | 6/1998 | Golden | ............... | G06Q 20/201 |
| | | | | | | 235/376 |
| 2004/0049427 | A1 | * | 3/2004 | Tami | .................. | G06Q 20/209 |
| | | | | | | 705/24 |
| 2005/0211773 | A1 | * | 9/2005 | Nobutani | ............ | G06Q 20/20 |
| | | | | | | 235/383 |

(Continued)

FOREIGN PATENT DOCUMENTS

| JP | H0350260 U | 5/1991 |
| JP | 10255168 A | 9/1998 |

(Continued)

OTHER PUBLICATIONS

"EL-2630PIII Electronic Printing Calculator Operation Manual". Sharp. 2005.*

(Continued)

*Primary Examiner* — Nathan A Mitchell
(74) *Attorney, Agent, or Firm* — Holtz, Holtz & Volek PC

(57) ABSTRACT

According to one embodiment, a tax calculation apparatus includes a display, a printer and a processor. The processor is configured to execute processes of accepting a tax calculation operation by a user; deriving tax calculation result data by executing a calculation based on a numerical data, in response to a input of the numerical data and the acceptance of the tax calculation operation, causing the display to display the tax calculation result data, and causing the printer to print tax calculation print data including the tax (Continued)

calculation result data and tax amount data corresponding to the tax calculation result data; and causing the display to display the tax amount data without printing, if the tax calculation operation is accepted in a state in which the tax calculation result data is displayed on the display.

15 Claims, 9 Drawing Sheets

(56) References Cited

U.S. PATENT DOCUMENTS

| | | | | |
|---|---|---|---|---|
| 2006/0111982 A1* | 5/2006 | Ito | ............ | G06Q 20/20 |
| | | | | 705/16 |
| 2007/0136157 A1* | 6/2007 | Neher, III | ............ | G06Q 40/02 |
| | | | | 705/31 |
| 2008/0300996 A1* | 12/2008 | Fei | ............ | G06Q 30/0601 |
| | | | | 705/26.8 |
| 2009/0037305 A1* | 2/2009 | Sander | ............ | G06Q 30/04 |
| | | | | 705/31 |
| 2012/0069404 A1* | 3/2012 | Kodama | ............ | G06F 3/1206 |
| | | | | 358/1.18 |
| 2012/0173351 A1* | 7/2012 | Hanson | ............ | G06Q 20/204 |
| | | | | 705/17 |
| 2013/0041693 A1* | 2/2013 | Thomas | ............ | G06Q 10/10 |
| | | | | 705/4 |
| 2015/0058188 A1* | 2/2015 | Bartlett | ............ | G06Q 40/123 |
| | | | | 705/31 |
| 2016/0180305 A1* | 6/2016 | Dresser | ............ | G06Q 20/223 |
| | | | | 705/40 |

FOREIGN PATENT DOCUMENTS

| | | |
|---|---|---|
| JP | 2002099516 A | 4/2002 |
| JP | 2010244172 A | 10/2010 |

OTHER PUBLICATIONS

Japanese Office Action (and English language translation thereof) dated Jul. 9, 2019 issued in counterpart Japanese Application No. 2016-131122.

* cited by examiner

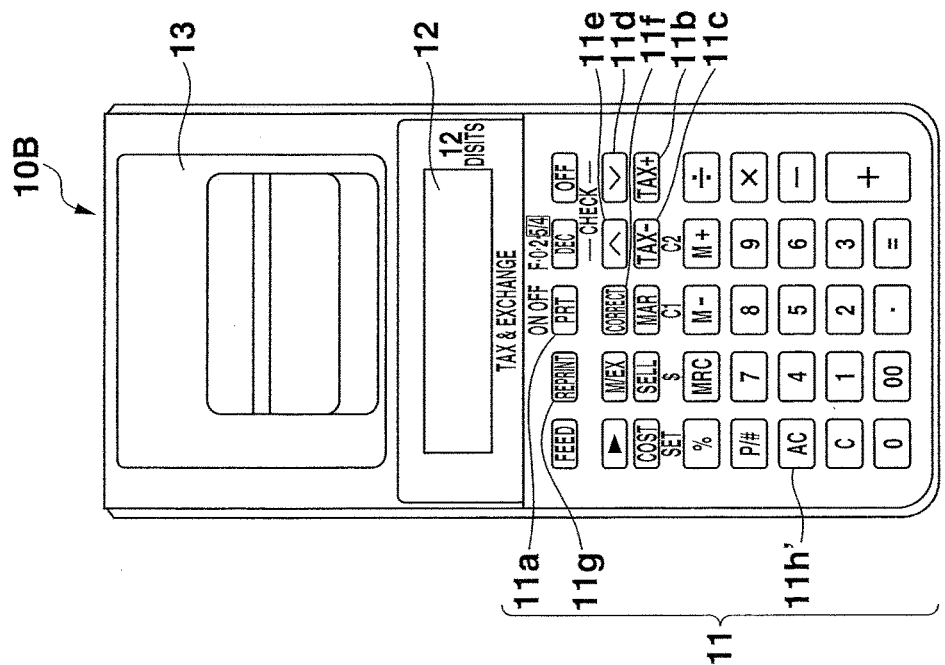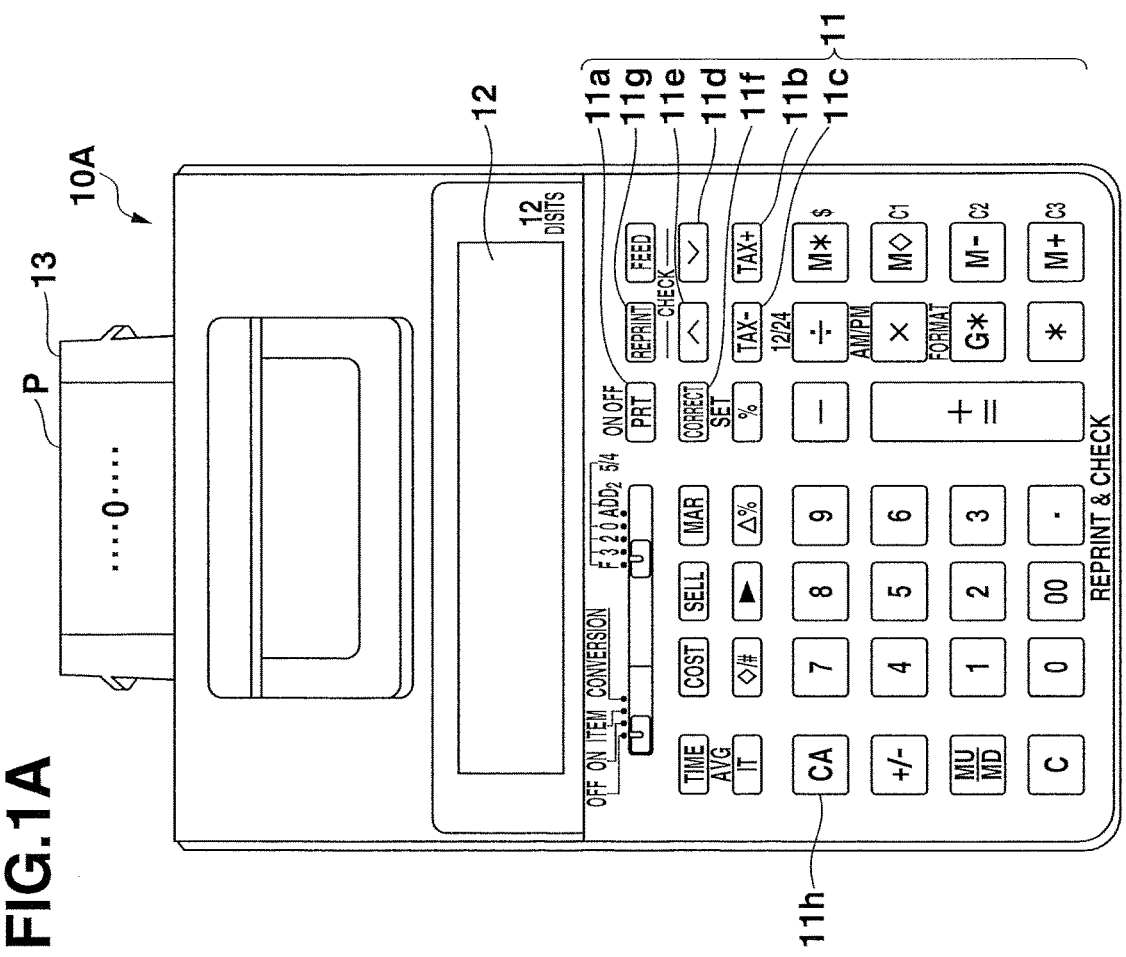

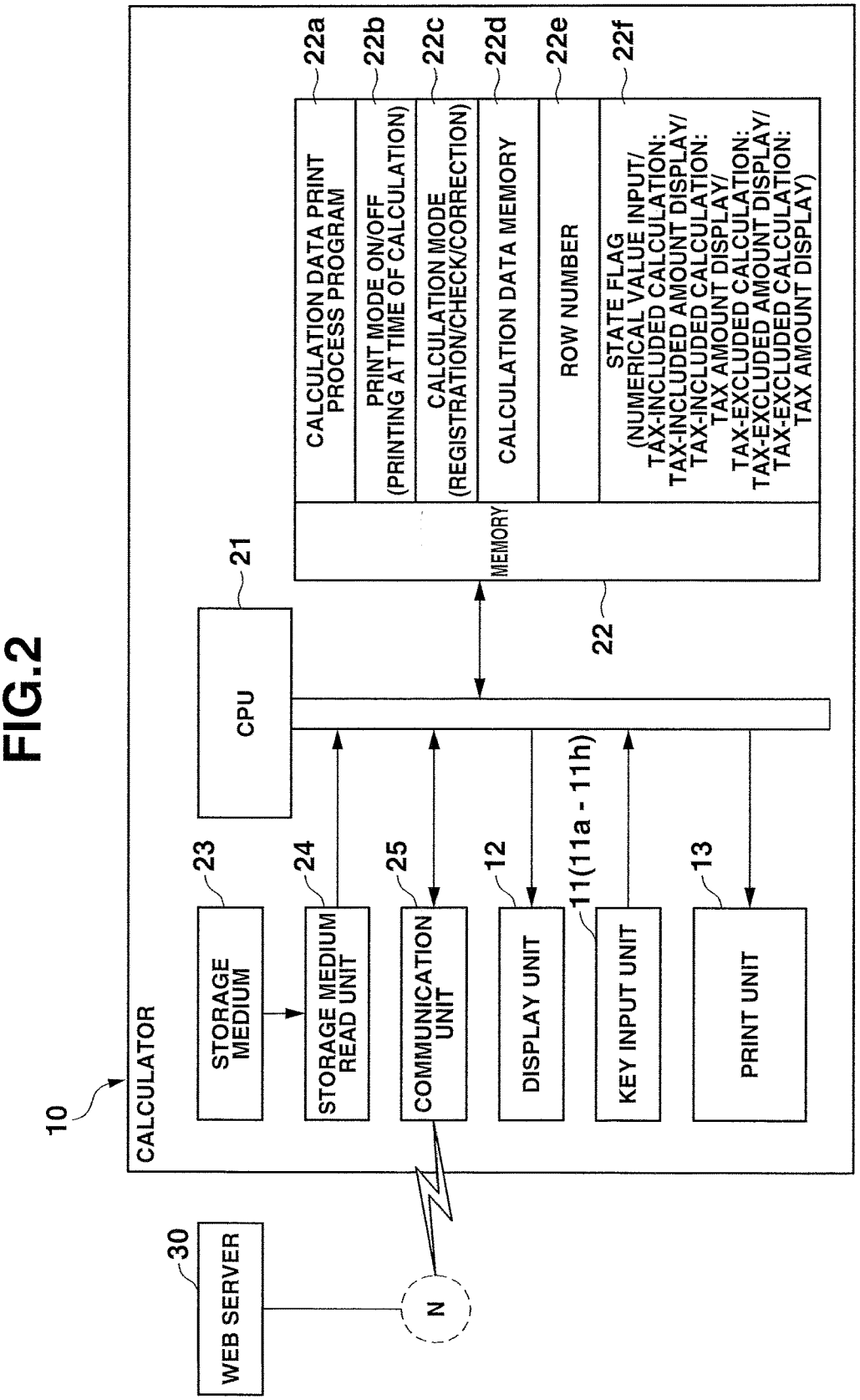

FIG.3A

BEFORE CORRECTION  22d

| ROW NUMBER | CALCULATION OPERATION DATA |
|---|---|
| 1 | 200 [TAX+] |
| 2 | [TAX+] |
| 3 | [TAX+] |
| 4 | [TAX-] |
| 5 | |

FIG.3B

AFTER CORRECTION

| ROW NUMBER | CALCULATION OPERATION DATA |
|---|---|
| 1 | 300 [TAX+] |
| 2 | [TAX+] |
| 3 | [TAX+] |
| 4 | [TAX-] |
| 5 | |

FIG.4A

BEFORE CORRECTION  22d

| ROW NUMBER | CALCULATION OPERATION DATA |
|---|---|
| 1 | 216 [TAX-] |
| 2 | [TAX-] |
| 3 | [TAX-] |
| 4 | [TAX+] |
| 5 | |

FIG.4B

AFTER CORRECTION

| ROW NUMBER | CALCULATION OPERATION DATA |
|---|---|
| 1 | 324 [TAX-] |
| 2 | [TAX-] |
| 3 | [TAX-] |
| 4 | [TAX+] |
| 5 | |

…

TAX CALCULATION APPARATUS, TAX CALCULATION METHOD, AND STORAGE MEDIUM STORING PROGRAM

CROSS-REFERENCE TO RELATED APPLICATIONS

This application is based upon and claims the benefit of priority from prior Japanese Patent Application No. 2016-131122, filed Jun. 30, 2016, the entire contents of which are incorporated herein by reference.

BACKGROUND OF THE INVENTION

1. Field of the Invention

The present invention relates to a tax calculation apparatus, such as an electronic calculator (printer-equipped electronic calculator), which includes a tax calculation function and a print function, a tax calculation method, and a storage medium storing a control program thereof.

2. Description of the Related Art

Conventionally, there is known a POS system (point of sales system) which executes a tax calculation of commodities which a customer purchased, and prints a tax-excluded amount, a tax amount, and a tax-included amount on a receipt. In addition, in the POS system, it is thought that a receipt is reprinted by correcting the content of the calculation (see, for example, Jpn. Pat. Appln. KOKAI Publication No. H10-255168).

With the conventional POS system and printer, not only a tax-excluded amount but also a tax amount are printed on a receipt. However, since the position of an operation terminal, such as a keyboard, on which a user such as a salesclerk performs an input operation, is different from the position of the printer which prints and outputs the receipt, it is not possible for the user to easily check whether the content of the tax calculation, which was input by the user, is correct or not.

BRIEF SUMMARY OF THE INVENTION

The object of the present invention is to provide a tax calculation apparatus which enables an easy check of the content of a tax calculation and can minimize the amount of print, a tax calculation method, and a storage medium storing a control program thereof.

In general, according to one embodiment, a tax calculation apparatus includes a display, a printer and a processor. The processor is configured to execute processes of inputting numerical data in accordance with a user operation; accepting a tax calculation operation by a user; deriving tax calculation result data by executing a calculation based on the numerical data, in response to the input of the numerical data and the acceptance of the tax calculation operation, causing the display to display the tax calculation result data, and causing the printer to print tax calculation print data including the tax calculation result data and tax amount data corresponding to the tax calculation result data; and causing the display to display the tax amount data without printing, if the tax calculation operation is accepted in a state in which the tax calculation result data is displayed on the display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1A and FIG. 1B are front views illustrating external-appearance configurations of a printer-equipped electronic calculator 10 according to an embodiment of a tax calculation apparatus of the present invention.

FIG. 2 is a block diagram illustrating a configuration of electronic circuitry of the printer-equipped electronic calculator 10.

FIG. 3A and FIG. 3B are views illustrating concrete examples of a first embodiment of calculation data registered in a calculation data memory 22d of the printer-equipped electronic calculator 10.

FIG. 4A and FIG. 4B are views illustrating concrete examples of a second embodiment of calculation data registered in the calculation data memory 22d of the printer-equipped electronic calculator 10.

DETAILED DESCRIPTION OF THE PREFERRED EMBODIMENTS

Figure 5:
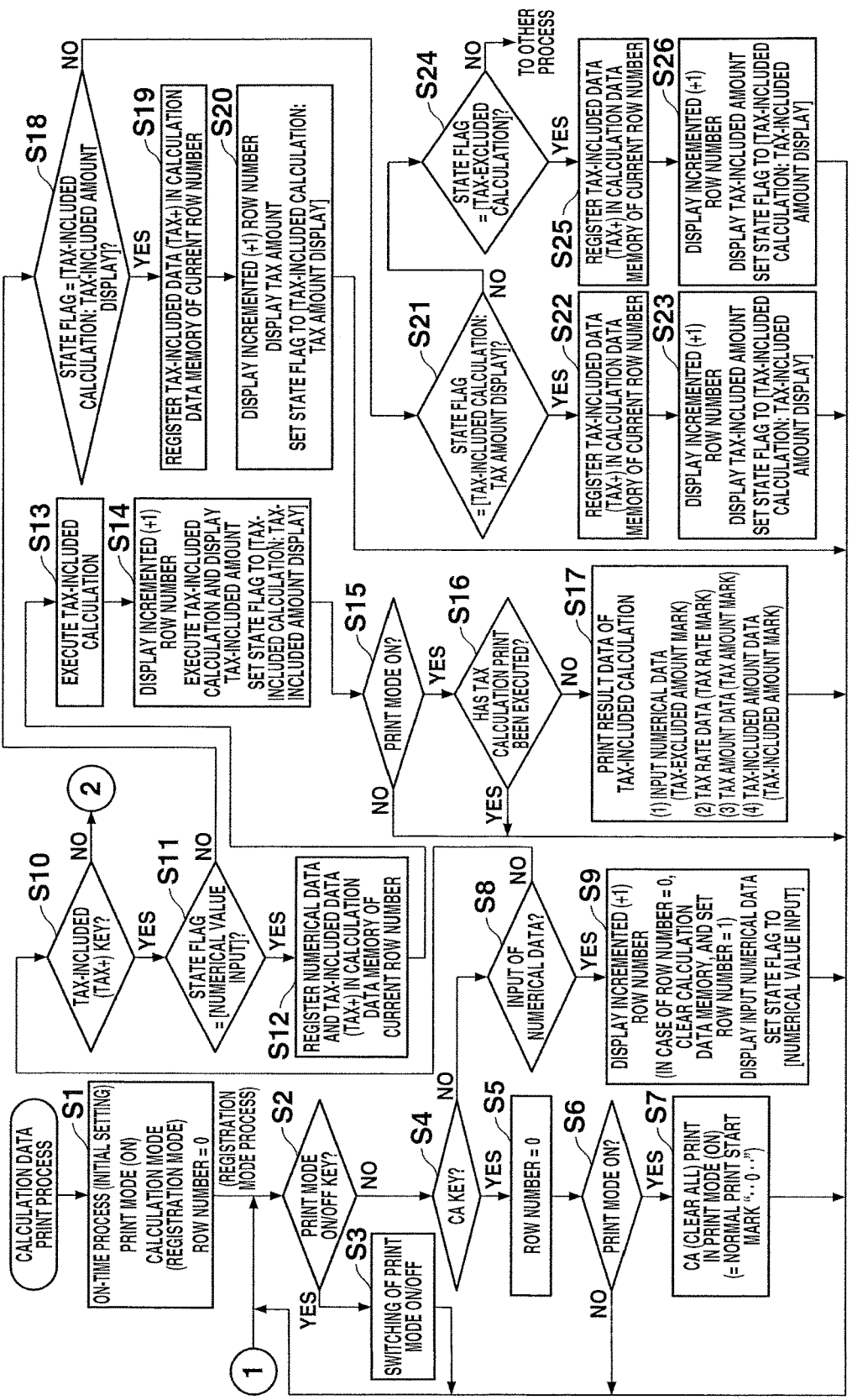
FIG. 5 is a flowchart illustrating a calculation data print process (part 1) of the printer-equipped electronic calculator 10.

Embodiments of the present invention will be described hereinafter with reference to the accompanying drawings.

FIG. 1A and FIG. 1B are front views illustrating external-appearance configurations of a printer-equipped electronic calculator 10 according to an embodiment of a tax calculation apparatus of the present invention.

In the present embodiment, the printer-equipped electronic calculator 10 is realized as a just-type calculator 10A illustrated in FIG. 1A, and as a mini-just-type calculator 10B illustrated in FIG. 1B. The calculators 10A and 10B can execute substantially the same process, with only the keys and printers mounted on the housings being different.

The printer-equipped electronic calculator 10 may be configured as, aside from the electronic calculator 10A, 10B, a personal computer, a tablet computer, a smartphone, a mobile phone, a touch-panel PDA (personal digital assistants), an electronic book, a portable game console, etc., which include calculation functions and print functions (i.e. in which calculation data print process programs are installed).

Incidentally, a calculator, which is not equipped with such physical keys (buttons) as provided on the calculator 10, displays a software keyboard like the keys of the calculator 10, and executes a calculation process in response to a key operation on the software keyboard. In addition, a calculator, which is not equipped with such a printer as provided on the printer-equipped electronic calculator 10, is wirelessly connected to an external printer by near-field wireless communication or the like, and transmits a print control signal and print data to the printer, thereby executing a print process.

The printer-equipped electronic calculator 10A illustrated in FIG. 1A will now be described. The printer-equipped electronic calculator 10A according to the present embodiment is provided with a tax calculation function of executing a tax calculation based on a preset tax rate for numerical data as a target, which was input in response to a user operation; a display function of displaying calculation data of the tax calculation, the calculation data including a tax-included amount and a tax amount calculated by the tax calculation function; and a print function of printing the calculation data of the tax calculation, in addition to an ordinary calculation function, display function and print function relating to addition, subtraction, multiplication and division.

The printer-equipped electronic calculator 10A includes a key input unit 11 on a front side of a stationary-type body case which is disposed on the desk for an easy operation. The calculator 10A further includes a display unit 12 and a print unit 13 on the rear side of the key input unit 11.

The key input unit 11 includes numeric keys, arithmetic keys, tax calculation function keys, print function keys, check/correction function keys, and other function keys.

The numeric keys include a plurality of keys corresponding to, for example, [00], and [0]~[9]. The arithmetic keys include a plurality of keys corresponding to, for example, an [+=] (addition total) key, a [−] (subtraction) key, a [×] (multiplication) key, and a [+] (division) key. Incidentally, when the [+=] (addition total) was input, calculation data of the total of addition of numerical values, which were input immediately before the input of the [+=] key, can be obtained.

The tax calculation function keys include a plurality of keys corresponding to a [TAX+] (tax-included calculation: tax calculation 1) key 11b, and a [TAX−] (tax-excluded calculation: tax calculation 2) key 11c. The print function keys include a plurality of keys corresponding to a [PRT] (print mode) key 11a, and a [REPRINT] (registered data print) key 11g. The check/correction function keys include a plurality of keys corresponding to registered data check keys ([∇] key 11d, [Δ] key 11e), and a [CORRECT] (correction) key 11f. The other function keys include, for example, a clear-all key ([CA] key 11h), a clear key ([C] key), a plurality of memory keys ([M*], [M−], [M+]), a grand total key ([G*] key), and a total key ([*] key).

The display unit 12 is composed of a dot-matrix-type liquid crystal display unit. A numerical value, which is input by an operation on the keys of the key input unit 11, is displayed on the display unit 12. A numerical value of a limited number of rows (e.g. one row) is displayed on the display unit 12. In addition, numerals, characters and signs (symbols), which indicate various states, such as a row number of calculation operation data and a currently set calculation mode, are displayed on a state display area which is provided along a side of the display unit 12.

The printer-equipped electronic calculator 10B illustrated in FIG. 1B is provided with keys to which the same functions as in the printer-equipped electronic calculator 10A illustrated in FIG. 1A are allocated. The keys, to which the same functions as in the calculator 10A are allocated, are denoted by the same reference numerals as with the calculator 10A, and a description thereof is omitted. Incidentally, in the calculator 10B, an all-clear key ([AC] key 11h') corresponds to the clear-all key ([CA] key 11h) of the calculator 10A.

The print unit 13 includes a print mechanism of, for example, a thermal-transfer method. Based on a setting state of a print mode OFF/ON corresponding to the operation of the [PRT] key 11a and the input state of the [REPRINT] key 11g, the print unit 13 prints on a recording sheet P a result of a calculation which was performed in accordance with input numerical data and a tax calculation operation, and a result of a calculation which was performed with respect to the above-described calculation operation data, and outputs such printed results.

FIG. 2 is a block diagram illustrating the configuration of electronic circuitry of the printer-equipped electronic calculator 10.

The electronic circuitry of the printer-equipped electronic calculator 10 includes a CPU (processor) 21 which is a computer. The CPU 21 controls the operations of the respective circuitry components according to a calculator control program which is stored in a memory 22, and executes various calculation functions and a print function of calculation data, which correspond to user operations of the key input unit 11.

The key input unit 11, display unit 12, print unit 13 and memory 22 are connected to the CPU (processor) 21. In addition, a storage medium read unit 24, which reads data that is stored in an external storage medium 23 such as a memory card, and a communication unit 25, which executes communication with an external device (30), are connected to the CPU (processor) 21.

The calculator control program is prestored in the memory 22, or is read from the external storage medium 23 by the storage medium read unit 24 and stored in the memory 22, or is downloaded from a Web server (program server) 30 on a communication network N via the communication unit 25 and stored in the memory 22.

The computer control program includes various calculation process programs (including a tax calculation process program) corresponding to user operations, and also includes a calculation data print process program 22a for printing calculation data of calculation processes which are executed in accordance with the calculation process programs.

In addition, in the memory 22, a PRINT mode memory 22b, a calculation mode memory 22c, a calculation data memory 22d, a row number memory 22e and a state flag memory 22f are secured.

In the PRINT mode memory 22b, setting data of print mode ON is stored in the initial setting at a power-ON time of the calculator 10. Then, each time the [PRT] (print mode) key 11a is operated, setting data of print mode OFF and setting data of print mode ON are switchedly stored. Incidentally, in the state of print mode ON, print is performed each time the input of calculation data is finally determined.

The calculation mode memory 22c stores setting data of a registration mode in which calculation operation data, which is composed of numerical data that is input in response to a user operation and operation data or arithmetic operation data of a tax calculation by a user, is successively registered; setting data of a check (verification) mode in which the calculation operation data, which was registered in the registration mode, is called and displayed in response to the input of the registered data check keys ([Δ] key 11d, [∇] key 11e); or setting data of a correction mode in which the calculation operation data, which was called and displayed in the check (verification) mode, is set in a correctable state as a target of correction by the input of the [CORRECT] (correction) key 11f.

In the calculation data memory 22d, a series of calculation data, which was input in accordance with the user operation in the registration mode, is stored and registered as calculation operation data which is associated with sequentially incremented row numbers.

FIG. 3A, FIG. 3B, FIG. 4A and FIG. 4B are views illustrating concrete examples of calculation operation data registered in the calculation data memory 22d of the printer-equipped electronic calculator 10. FIG. 3A and FIG. 3B are views illustrating concrete examples of a first embodiment, and FIG. 4A and FIG. 4B are views illustrating concrete examples of a second embodiment.

The row number memory 22e stores data of a row number that is a processing target of the calculation data memory 22d, in each of the registration mode, check mode, correction mode, and reprint mode (registered data print mode) corresponding to an operation of the [REPRINT] key 11g.

The state flag memory 22f stores a state flag indicating whether the operation state of the calculator 10 corresponding to the calculation data print process (22a) is a [numerical value input state] in which numerical data is input, a [tax-included amount display state of tax-included calculation], [tax amount display state of tax-included calculation], a [tax-excluded amount display state of tax-excluded calculation], or a [tax amount display state of tax-excluded calculation].

In the printer-equipped electronic calculator 10 with the above-described configuration, the CPU 21 controls the operations of the respective circuitry components in accordance with the instructions described in the calculator control program (including the calculation data print process program 22a). In addition, the software and hardware cooperatively operate to realize various calculation functions and a print function of calculation data, which will be described in the following description of the operations.

Next, the operation of the printer-equipped electronic calculator 10 with the above-described configuration is described.

Figure 6:
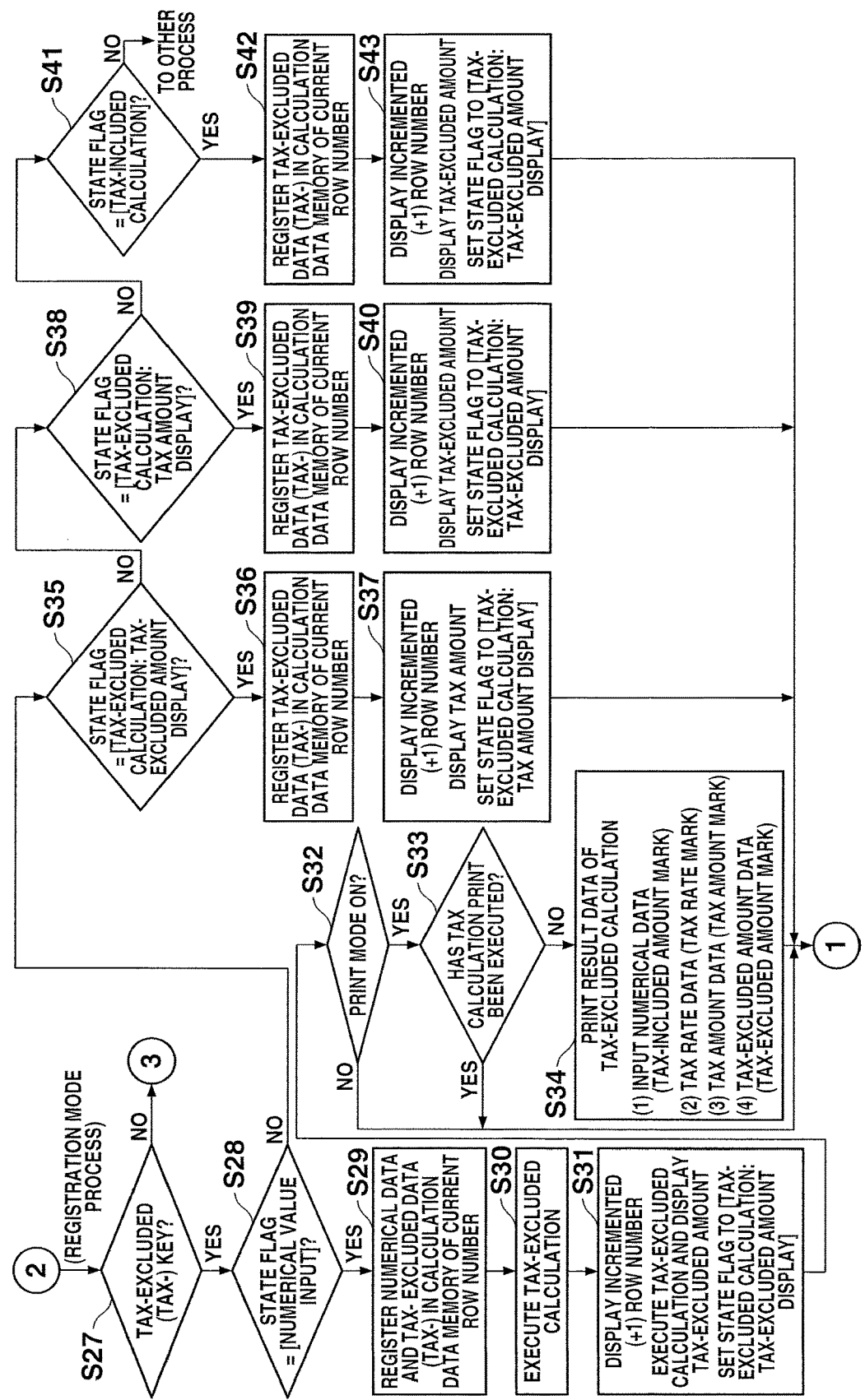
FIG. 6 is a flowchart illustrating a calculation data print process (part 2) of the printer-equipped electronic calculator 10.
Figure 7:
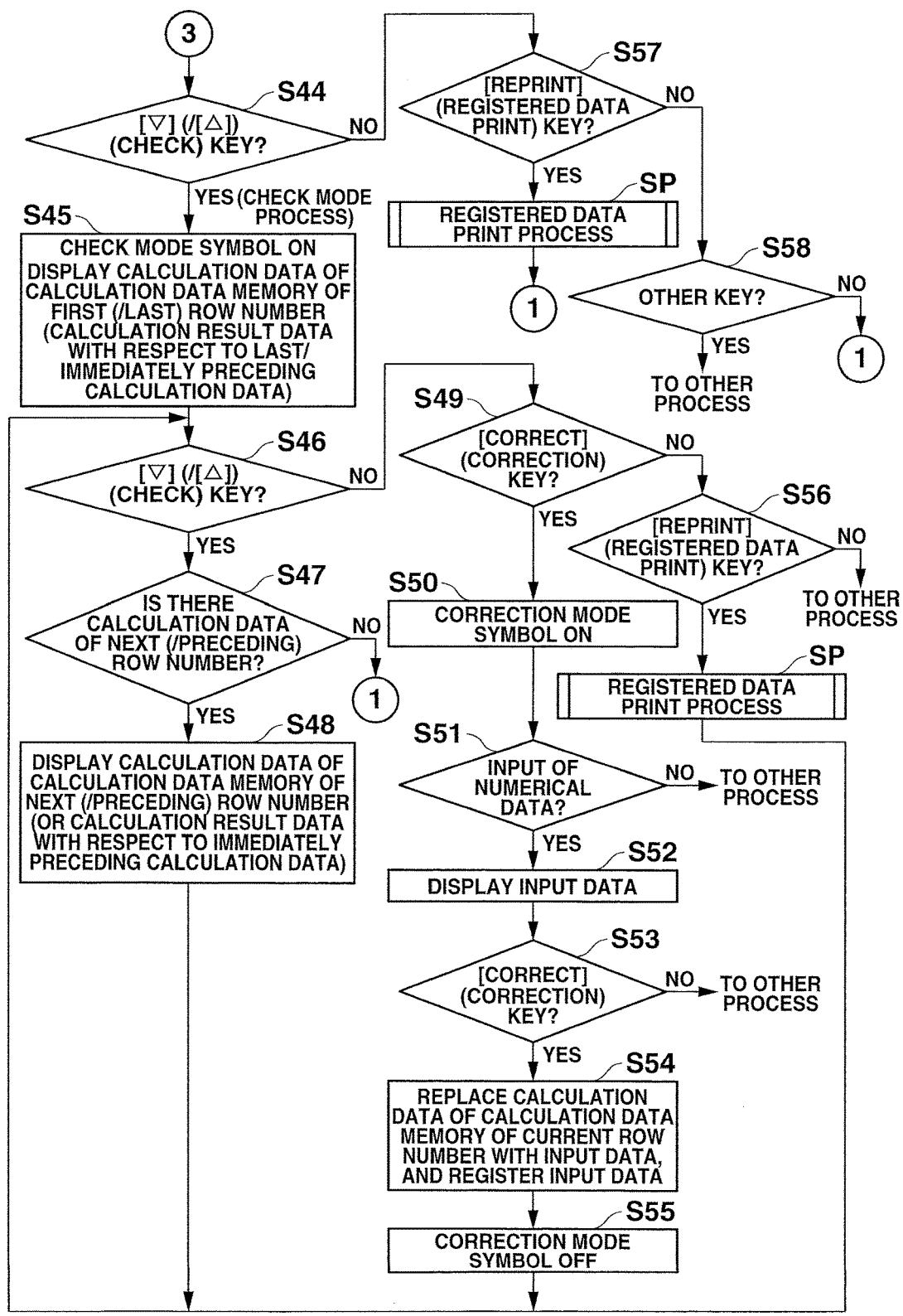
FIG. 7 is a flowchart illustrating a calculation data print process (part 3) of the printer-equipped electronic calculator 10.

FIG. 5, FIG. 6 and FIG. 7 are flowcharts illustrating a calculation data print process (part 1, part 2 and part 3) of the printer-equipped electronic calculator 10.

Figure 8:
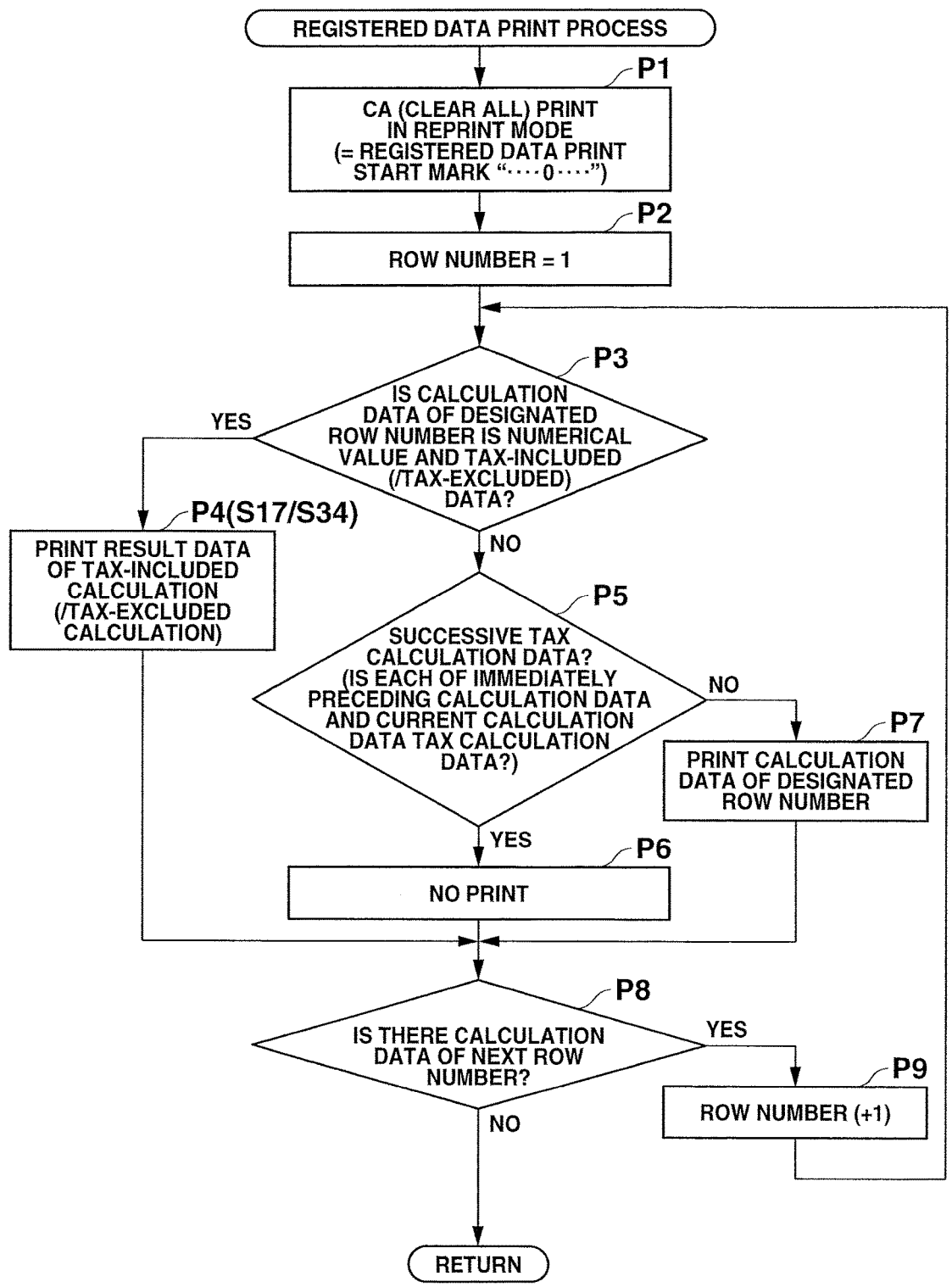
FIG. 8 is a flowchart illustrating a registered data print process in the calculation data print process (part 3) of the printer-equipped electronic calculator 10.

FIG. 8 is a flowchart illustrating a registered data print process in the calculation data print process (part 3) of the printer-equipped electronic calculator 10.

First Embodiment

In this first embodiment, a description is given of an operation in a state in which the setting data of print mode ON is stored in the PRINT mode memory 22b.

Figure 9:
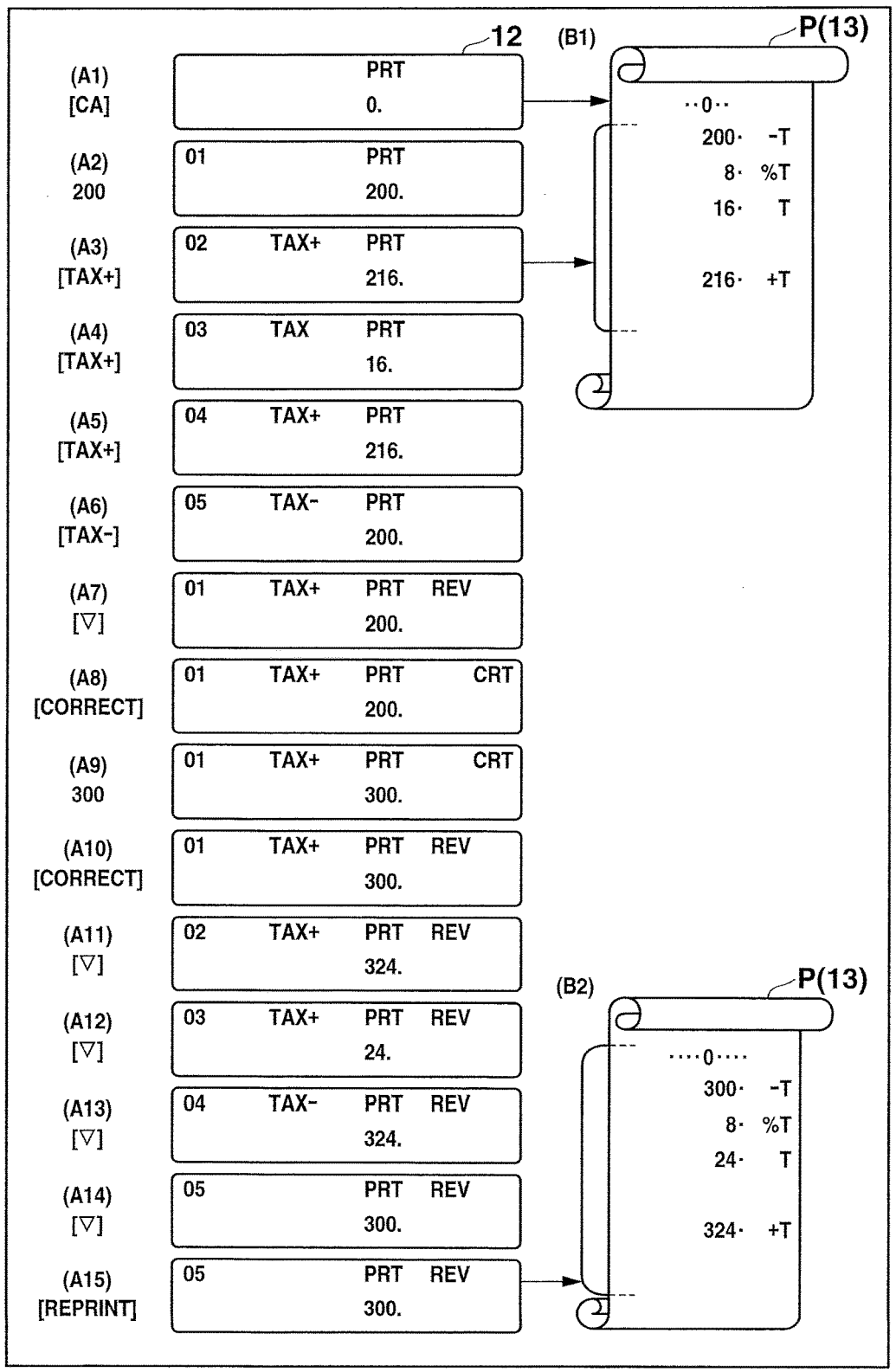
FIG. 9 is a view illustrating a display/print operation corresponding to a user operation of the first embodiment of the calculation data print process.

FIG. 9 is a view illustrating a display/print operation corresponding to a user operation of the first embodiment of the calculation data print process.

In the printer-equipped electronic calculator 10A, if power is turned on in response to a user operation, the CPU 21 stores the setting data of print mode (ON) in the PRINT mode memory 22b, stores the setting data of the registration mode in the calculation mode memory 22c, and stores data of row number "0" in the row number memory 22e, in the initial setting process corresponding to the power-ON (step S1).

In the state of the print mode (ON), for example, if the [CA] key 11h is operated, for example, as illustrated in FIG. 9 part (A1) (step S4 (Yes)), the data of the row number is re-set to "0" (step S5). At this time, the display unit 12 displays numerical data "0" and a symbol "PRT" indicative of the state of the print mode (ON).

Here, if the CPU 21 determines the state of the print mode (ON) (step S6 (Yes)), the print unit 13 prints, on a recording sheet P, a normal print start mark "• • 0 • •", which indicates a print corresponding to the operation of the [CA] (Clear All) key 11h in the print mode (ON) state, as illustrated in FIG. 9 part (B1) (step S7).

Then, as illustrated in FIG. 9 part (A2), if numerical data "200", which is, for example, a commodity price (tax-excluded price), is input in response to a user operation of the numeric keys (step S8 (Yes)), the data of the row number is incremented by (+1) and updated to "01", and the row number "01" is displayed on the display unit 12. In addition, the input numerical data "200" is displayed on the display unit 12. Further, the state flag of the state flag memory 22f is set to [numerical value input state] (step S9).

Here, as illustrated in FIG. 9 part (A3), if the [TAX+] (tax-included calculation: tax calculation 1) key 11b is operated (step S10 (Yes)), it is determined whether the state flag of the state flag memory 22f is [numerical value input state] or not (step S11).

If it is determined that the state flag is [numerical value input state] (step S11 (Yes)), the input numerical data "200" and tax-included (tax calculation 1) data [TAX+], which corresponds to the [TAX+] (tax-included calculation: tax calculation 1) key 11b, are stored and registered in the area of row number "01" of the calculation data memory 22d (see FIG. 3A), in accordance with the current row number data "01" stored in the row number memory 22e (step S12).

Then, a tax-included calculation (tax calculation 1) (the tax rate is 8% in the present embodiment) for the numerical data "200" is executed (step S13). (A tax-included amount, which is tax calculation result data, is derived by executing a tax-included calculation based on the numerical data "200".) The row number data "01" is incremented by (+1) and updated to "02", and the row number "02" is displayed on the display unit 12. In addition, tax-included amount data (tax calculation 1 result data) "216", which was obtained by the tax-included calculation, is displayed, and a symbol "TAX+" indicative of the tax-included amount is displayed. Besides, the state flag of the state flag memory 22f is set to [tax-included amount display state of tax-included calculation] (step S14).

Here, if it is determined that the setting data of print mode ON is stored in the PRINT mode memory 22b (step S15 (Yes)) and if it is determined that the result data of the tax-included calculation (tax calculation 1) has not been printed (step S16 (No)), the print unit 13 prints, on the recording sheet P, the input numerical data (tax-excluded amount data) "200" and a tax-excluded amount mark "–T"; tax rate data "8" and a tax rate mark "%T"; tax amount data "16" and a tax amount mark "T"; and tax-included amount data (tax calculation 1 result data) "216" and a tax-included amount mark "+T", as tax calculation print data of the tax calculation, following the normal print start mark "• • 0 • •" which was printed on the recording sheet P, as illustrated in FIG. 9 part (B1) (step S17).

Here, as illustrated in FIG. 9 part (A4), if the [TAX+] (tax-included calculation: tax calculation 1) key 11b is operated once again (step S10 (Yes)), it is determined that the state flag of the state flag memory 22*f* is [tax-included amount display state of tax-included calculation] (step S18 (Yes)).

Then, tax-included data (tax calculation 1 data) [TAX+], which corresponds to the [TAX+] (tax-included calculation: tax calculation 1) key 11*b*, is stored and registered in the area of row number "02" of the calculation data memory 22*d* (see FIG. 3A), in accordance with the current row number data "02" stored in the row number memory 22*e* (step S19).

Then, the row number data "02" is incremented by (+1) and updated to "03", and row number data "03" is displayed. In addition, tax amount data "16", which was obtained by the tax-included calculation, is displayed, and a symbol "TAX" indicative of the tax amount is displayed. Further, the state flag of the state flag memory 22*f* is set to [tax amount display state of tax-included calculation] (step S20).

Here, as illustrated in FIG. 9 part (A5), if the [TAX+] key 11*b* is operated once again (step S10 (Yes)), it is determined that the state flag of the state flag memory 22*f* is [tax amount display state of tax-included calculation] (step S21 (Yes)).

Then, tax-included data (tax calculation 1 data) [TAX+], which corresponds to the [TAX+] key 11*b*, is stored and registered in the area of row number "03" of the calculation data memory 22*d* (see FIG. 3A) in accordance with the current row number data "03" stored in the row number memory 22*e* (step S22).

Then, the row number data "03" is incremented by (+1) and updated to "04", and row number data "04" is displayed. In addition, the tax-included amount data "216" is displayed once again, and the symbol "TAX+" indicative of the tax-included amount is displayed. Further, the state flag of the state flag memory 22*f* is set to [tax-included amount display state of tax-included calculation] once again (step S23).

Here, as illustrated in FIG. 9 part (A6), if the [TAX−] (tax-excluded calculation: tax calculation 2) key 11*c* is operated (step S27 (Yes)), it is determined that the state flag is [(tax-included amount display) state of tax-included calculation] (step S41 (Yes)).

Then, tax-excluded data (tax calculation 2 data) [TAX−], which corresponds to the [TAX−] key 11*c*, is stored and registered in the area of row number "04" of the calculation data memory 22*d* (see FIG. 3A), in accordance with the current row number data "04" (step S42). Then, the row number data "04" is incremented by (+1) and updated to "05", and row number data "05" is displayed. In addition, the tax-excluded amount data "200" is displayed, and a symbol "TAX−" indicative of the tax-excluded amount is displayed. Further, the state flag of the state flag memory 22*f* is set to [tax-excluded amount display state of tax-excluded calculation] (step S43).

In this manner, when the numerical data "200" was input and the [TAX+] (tax-included calculation) key 11*b* was operated, the tax-included calculation is executed and the tax-included amount data "216" and the symbol "TAX+" thereof are displayed. Subsequently, if the [TAX+] key 11*b* is operated, the tax amount data "16" and the symbol "TAX" thereof, and the tax-included amount data "216" and the symbol "TAX+" thereof, are switchedly displayed each time the [TAX+] key 11*b* is operated. Further, if the [TAX−] key 11*c* is operated, the display can be switched to the tax-excluded amount data "200" and the symbol "TAX−" thereof.

Thus, the content of the tax calculation can easily be checked on the display unit 12 at hand.

In this case, the tax-included calculation (tax calculation 1) is executed in response to the input of the numerical data "200" and the operation of the [TAX+] (tax-included calculation) key 11*b*, and the tax calculation print data of the tax calculation (tax calculation 1), namely the tax-excluded amount data (input data) "200.−T", tax rate data "8.%T", tax amount data "16.T" and tax-included amount data (tax calculation 1 result data) "216.+T", are printed on the recording sheet P. Thereafter, even in the setting mode of the print mode ON, if the [TAX+] key 11*b* or the [TAX−] key 11*c* was successively operated, it is determined that the state flag continues to be the [(tax-included amount display/tax amount display) state of tax-included calculation] or [(tax-excluded amount display/tax amount display) state of tax-excluded calculation]. Thus, the print operation is not executed each time data is displayed and checked in the order of tax amount data "16"→tax-included amount data "216"→tax-excluded amount data "200", as illustrated in FIG. 9 part (A4) to FIG. 9 part (A6).

Next, as illustrated in FIG. 9 part (A7), if the registered data check key ([∇] key 11*d*) is operated (step S44 (Yes)) in order to check the content of a series of calculation operation data corresponding to the tax-included calculation (tax calculation 1), the setting data of the calculation mode memory 22*c* is set to the check (verification) mode, and a symbol "REV" of the check mode is displayed on the display unit 12. In addition, the calculation operation data (numerical data (tax-excluded amount data) "200" and tax-included (tax calculation 1) data [TAX+]), which are registered in association with the first row number "01" of the calculation data memory 22*d*, are called, and displayed on the display unit 12 together with this row number "01" (step S45).

Here, as illustrated in FIG. 9 part (A8), if the [CORRECT] (correction) key 11*f* is operated (step S49 (Yes)) in order to correct the numerical data (tax-excluded amount data) "200" corresponding to the row number "01" which was displayed on the display unit 12 and checked, the setting data of the calculation mode memory 22*c* is set to the correction mode, and a symbol "CRT" of the correction mode is displayed on the display unit 12 (step S50).

Then, as illustrated in FIG. 9 part (A9), correct numerical data "300" is input and displayed (step S51 (Yes)), S52). As illustrated in FIG. 9 part (A10), if the [CORRECT] (correction) key 11*f* is operated once again (step S53 (Yes)), the calculation data (numerical data (tax-excluded amount data)) "200", which is stored in the calculation data memory 22*d* in association with the current row number "01", is replaced with the input numerical data "300", and the numerical data "300" is registered (step S54) (see FIG. 3A, FIG. 3B). Then, the symbol "CRT" of the correction mode, which is displayed on the display unit 12, is deleted (step S55).

Thereafter, as illustrated in FIG. 9 part (A11) to FIG. 9 part (A14), if the registered data check key ([∇] key 11*d*) is repeatedly operated (step S46 (Yes)), it is confirmed, each time the registered data check key ([∇] key 11*d*) is operated, whether there is calculation operation data which is registered in the calculation data memory 22*d* in association with the next row number of the current row number (step S47). If there is calculation operation data which is associated with the next row number (step S47 (Yes)), this calculation operation data is called, and displayed on the display unit 12 together with the next row number (step S48).

Specifically, as illustrated in FIG. 9 part (A11), if the registered data check key ([∇] key 11*d*) is operated once again (the second operation in the check mode), the display unit 12 displays tax-included amount data (tax calculation 1 result data) "324", which was obtained by a tax-included calculation (tax calculation 1) based on the calculation operation data after the correction registered in association with the row number "01" (numerical data (tax-excluded amount data) "300" and tax-included data (tax calculation 1 data) [TAX+]), and also displays the symbol "TAX+" corresponding to the tax-included data [TAX+] that was called in association with the row number "02". In addition, as illustrated in FIG. 9 part (A12), if the registered data check key ([∇] key 11d) is operated (the third operation), the display unit 12 displays tax amount data "24", which is the result of the tax-included calculation (tax calculation 1) based on the tax-included data (tax calculation 1 data) registered in association with the row number "02", and also displays the symbol "TAX+" corresponding to the tax-included data [TAX+] that was called in association with the row number "03".

Further, as illustrated in FIG. 9 part (A13), if the registered data check key ([∇] key 11d) is operated (the fourth operation), the display unit 12 displays tax-included amount data "324", which is the result of the tax-included calculation (tax calculation) based on the tax-included data [TAX+] registered in association with the row number "03", and also displays the symbol "TAX−" corresponding to the tax-excluded data (tax calculation 2 data) [TAX−] that was called in association with the row number "04".

Moreover, as illustrated in FIG. 9 part (A14), if the registered data check key ([∇] key 11d) is operated (the fifth operation), the display unit 12 displays tax-excluded amount data (tax calculation 2 result data) "300", which is the result of the tax-excluded calculation (tax calculation) based on the tax-excluded data (tax calculation 2 data) [TAX−] registered in association with the row number "04".

Thereby, even after a part of the series of calculation data calculated by the tax-included calculation (or tax-excluded calculation) was corrected, the tax-included amount data after the correction, tax amount data and tax-excluded amount data can easily be checked by repeatedly operating the registered data check key ([∇] key 11d).

In the meantime, in step S44, if the registered data check key ([Δ] key 11e) is operated and the check (verification) mode is set, the calculation operation data associated with the last row number, among the series of calculation operation data registered in association with the respective row numbers of the calculation data memory 22d, is called and displayed (step S45).

In addition, in the check (verification) mode, if the registered data check key ([Δ] key 11e) is operated (step S46 (Yes)), the calculation operation data, which is registered in the calculation data memory 22d in association with a row number preceding the current row number, is called, and the result data of the tax calculation based on the calculation data and the symbol are displayed (step S47, S48).

Then, as illustrated in FIG. 9 part (A15), if the [RE-PRINT] (registered data print) key 11g is operated (step S56 (Yes)) in the state in which the tax-excluded amount data (tax calculation 2 result data) "300" corresponding to the calculation operation data (tax-excluded data (tax calculation 2 data) [TAX−]) of the row number "04" is being displayed, the registered data print process illustrated in FIG. 8 is executed (step SP).

Specifically, if the registered data print process is started, the print unit 13 prints, on the recording sheet P, a registered data print start mark "• • • • 0 • • • •", which indicates a [CA] (Clear All) print in the reprint mode, as illustrated in FIG. 9 part (B2) (step P1).

In addition, the current row number data of the row number memory 22e is set to "01" (step P2), and it is determined whether the calculation data registered in the calculation data memory 22d in association with current row number "01" is calculation data including numerical data and tax-included (or tax-excluded) data (step P3).

Here, it is determined that the calculation operation data registered in the calculation data memory 22d (see FIG. 3B) in association with the current row number "01" is calculation data including numerical data "300" and tax-included (calculation calculation 1 data) [TAX+] (step P3 (Yes)).

Then, following the registered data print start mark "• • • • 0 • • • •" printed on the recording sheet P, the print unit 13 prints, on the recording sheet P, the numerical data (tax-excluded amount data) "300" and tax-excluded amount mark "−T"; tax rate data "8" and tax rate mark "%T"; tax amount data "24" and tax amount mark "T"; and tax-included amount data (tax calculation 1 result data) "324" and tax-included amount mark "+T", as tax calculation print data corresponding to the numerical data "300" and tax-included data [TAX+] (step P4).

Thereafter, it is determined whether calculation operation data associated with the next row number is present in the calculation data memory 22d (see FIG. 3B) (step P8). Here, it is determined that calculation operation data (tax-included data [TAX+]) associated with the next row number "02" is present (step P8 (Yes)), and the current row number "01" of the row number memory 22e is incremented by (+1) and updated to "02" (step P9).

Then, it is determined that the calculation operation data registered in the calculation data memory 22d (see FIG. 3B) in association with the current row number "02" is tax-included data (tax calculation 1 data) [TAX+], and is not calculation data including numerical data and tax-included (or tax-excluded) data (step P3 (No)). In addition, since the tax-included data (tax calculation 1 data) [TAX+] exists both in the calculation operation data associated with the immediately preceding row number "01" and in the calculation operation data associated with the current row number "02", it is determined that the calculation data of the current row number is successive tax calculation data (step P5 (Yes)). In this case, printing on the recording sheet P is not performed (printing is suppressed in a state in which the CPU 21 is connected to the print unit 13 and the print unit 13 is in a printable state) (step P6).

Thereafter, in the same manner as described above, even when the current row number "02" is updated to "03" →"04" (step P8 (Yes)), P9), the calculation data associated with the respective row numbers are determined to be successive tax calculation data (step P3 (No)), P5 (Yes)), printing on the recording sheet P is not performed (printing is suppressed in a state in which the CPU 21 is connected to the print unit 13 and the print unit 13 is in a printable state) (step P6).

Thereby, even after a part of the series of calculation data calculated by the tax-included calculation (or tax-excluded calculation) was corrected, the tax-excluded amount data (−T), tax rate data (%T), tax amount data (T) and tax-included amount data (+T), which correspond to the result data of the tax-included calculation after the correction, can easily be printed on the recording sheet P by operating the [REPRINT] (registered data print) key 11g.

In this case, since the registered data print start mark "• • • • 0 • • • •" is printed at the top of the recording sheet P, the user can confirm the print of the registered data after the correction corresponding to the operation of the [RE-PRINT] key 11g, by clearly distinguishing this print from the normal print (normal print start mark "• • 0 • •") corresponding to the operation of the [CA] key 11h in the state of the print mode (ON).

If it is determined that the calculation data registered in the calculation data memory 22d in association with current row number is neither calculation data including numerical data and tax-included (or tax-excluded) data (step P3 (No)) nor successive tax calculation data (step P5 (No)), the calculation data registered in association with the current row number is printed (step P7).

Second Embodiment

In this second embodiment, a description is given of an operation in a state in which the setting data of print mode OFF is stored in the PRINT mode memory 22b.

Figure 10:
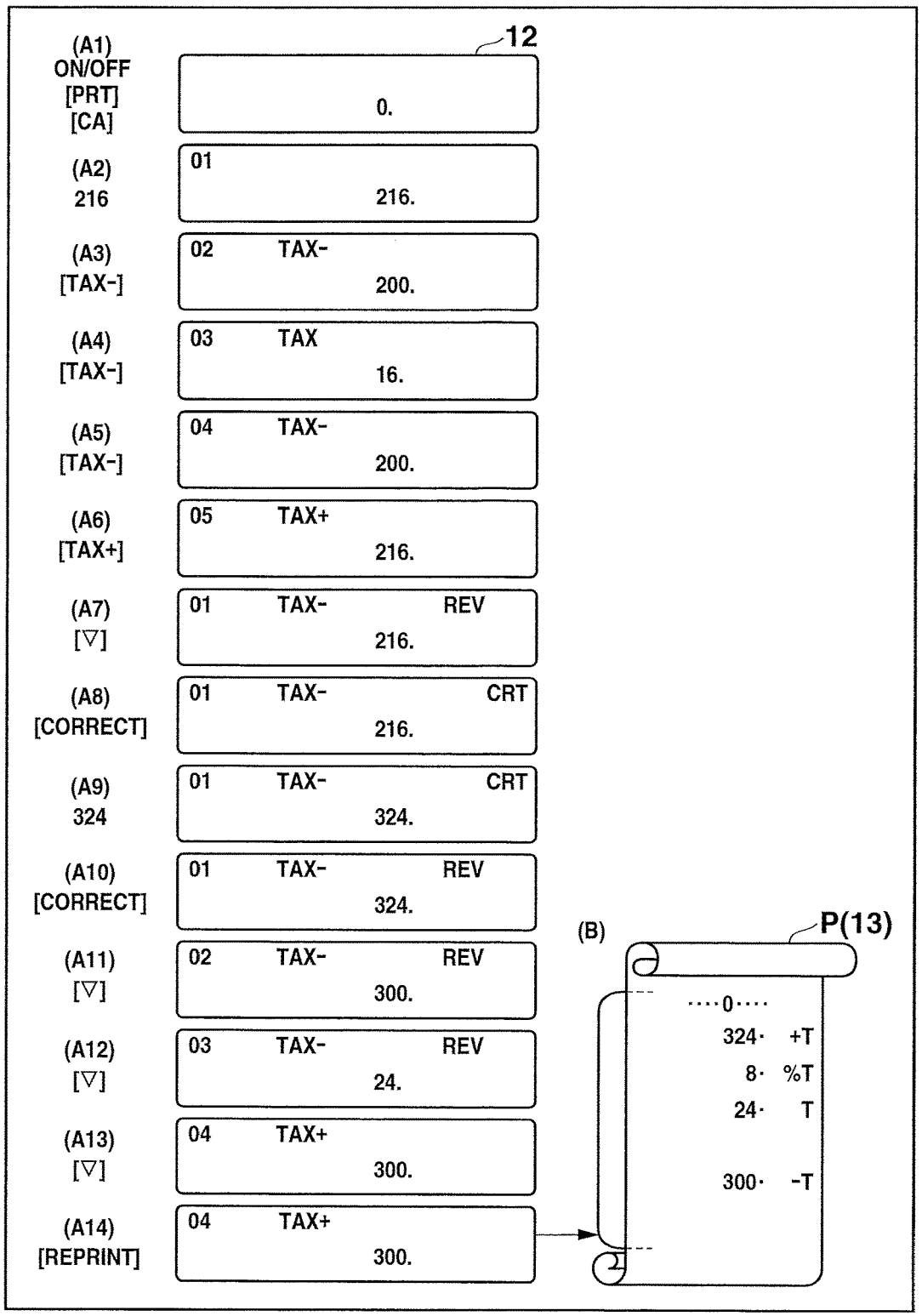
FIG. 10 is a view illustrating a display/print operation corresponding to a user operation of the second embodiment of the calculation data print process.

FIG. 10 is a view illustrating a display/print operation corresponding to a user operation of the second embodiment of the calculation data print process.

In the printer-equipped electronic calculator 10A, for example, in the state in which the setting data of the print mode (ON) is stored in the PRINT mode memory 22b by the initial setting process corresponding to the power ON (step S1), if the [PRT] (print mode) key 11a is operated (step S2 (Yes)), as illustrated in FIG. 10 part (A1), the setting data of the print mode (ON) is switched to the setting data of the print mode (OFF) (step S3).

Then, if the [CA] key 11h is operated (step S4 (Yes)), the row number data is set to "0" in the same manner as described above (step S5). At this time, since the state of the print mode is the print mode (OFF), the normal print start mark "• • 0 • •" is not printed on the recording sheet P (step S6 (No)).

Then, as illustrated in FIG. 10 part (A2), if numerical data "216", which is, for example, a commodity price (tax-included price), is input in response to a user operation of the numeric keys (step S8 (Yes)), the data of the row number is incremented by (+1) and updated to "01", and the row number "01" is displayed on the display unit 12. In addition, the input numerical data "216" is displayed on the display unit 12. In addition, the state flag of the state flag memory 22f is set to [numerical value input state] (step S9).

Here, as illustrated in FIG. 10 part (A3), if the [TAX−] (tax-excluded calculation: tax calculation 2) key 11c is operated (step S27 (Yes)), it is determined that the state flag of the state flag memory 22f is [numerical value input state] (step S28 (Yes)). The input numerical data (tax-included amount) "216" and tax-excluded data (tax calculation 2 data) [TAX−], which corresponds to the [TAX−] (tax-excluded calculation: tax calculation 2) key 11c, are stored and registered in the area of row number "01" of the calculation data memory 22d (see FIG. 4A), in accordance with the current row number data "01" stored in the row number memory 22e (step S29).

Then, a tax-excluded calculation (tax calculation 2) (tax rate (8%)) for the numerical data (tax-included amount) "216" is executed (step S30). (A tax-excluded amount, which is tax calculation result data, is derived by executing a tax-excluded calculation based on the numerical data "216".) The row number data "01" is incremented by (+1) and updated to "02", and the row number "02" is displayed on the display unit 12. In addition, tax-excluded amount data "200", which was obtained by the tax-excluded calculation, is displayed, and the symbol "TAX−" indicative of the tax-excluded amount is displayed. Besides, the state flag of the state flag memory 22f is set to [tax-excluded amount display state of tax-excluded calculation] (step S31).

Here, if it is determined that the setting data of print mode ON is stored in the PRINT mode memory 22b (step S32 (Yes)) and if it is determined that the tax calculation print data of the tax-excluded calculation (tax calculation 2) has not been printed (step S33 (No)), the print unit 13 prints, on the recording sheet P, the input numerical data (tax-included amount data) "216" and tax-included amount mark "−T"; tax rate data "8" and tax rate mark "%T"; tax amount data "16" and tax amount mark "T"; and tax-excluded amount data (tax calculation 2 result data) "200" and tax-excluded amount mark "−T", as tax calculation print data of the tax-excluded calculation (tax calculation 2), following the normal print start mark "• • 0 • •" which was initially printed (steps S4 to S7) on the recording sheet P (step S34).

In the meantime, in the second embodiment, since the state of the print mode is the print mode OFF (step S32 (No)), the result data of the tax-excluded calculation in step S34 is not printed.

Here, as illustrated in FIG. 10 part (A4), if the [TAX−] (tax-excluded calculation: tax calculation 2) key 11c is operated once again (step S27 (Yes)), it is determined that the state flag of the state flag memory 22f is [tax-excluded amount display state of tax-excluded calculation] (step S35 (Yes)).

Then, tax-excluded data (tax calculation 2) [TAX−], which corresponds to the [TAX−] (tax-excluded calculation) key 11c, is stored and registered in the area of row number "02" of the calculation data memory 22d (see FIG. 4A), in accordance with the current row number data "02" stored in the row number memory 22e (step S36).

Then, the row number data "02" is incremented by (+1) and updated to "03", and row number data "03" is displayed. In addition, tax amount data "16", which was obtained by the tax-excluded calculation, is displayed, and the symbol "TAX" indicative of the tax amount is displayed. Further, the state flag of the state flag memory 22f is set to [tax amount display state of tax-excluded calculation] (step S37).

Here, as illustrated in FIG. 10 part (A5), if the [TAX−] key 11c is operated once again (step S27 (Yes)), it is determined that the state flag is [tax amount display state of tax-excluded calculation] (step S38 (Yes)).

Then, tax-excluded data (tax calculation 2 data) [TAX−], which corresponds to the [TAX−] key 11c, is stored and registered in the area of row number "03" of the calculation data memory 22d (see FIG. 4A) in accordance with the current row number data "03" stored in the row number memory 22e (step S39).

Then, the row number data "03" is incremented by (+1) and updated to "04", and row number data "04" is displayed. In addition, the tax-excluded amount data "200", which was obtained by the tax-excluded calculation, is displayed once again, and the symbol "TAX−" indicative of the tax-excluded amount is displayed. Further, the state flag of the state flag memory 22f is set to [tax-excluded amount display state of tax-excluded calculation] once again (step S40).

Here, as illustrated in FIG. 10 part (A6), if the [TAX+] (tax-included calculation: tax calculation 1) key 11b is operated (step S10 (Yes)), it is determined that the state flag is [(tax-excluded amount display) state of tax-excluded calculation] (step S24 (Yes)).

Then, tax-included data (tax calculation 1 data) [TAX+], which corresponds to the [TAX+] key 11b, is stored and registered in the area of row number "04" of the calculation data memory 22d (see FIG. 4A), in accordance with the current row number data "04" (step S25).

Then, the row number data "04" is incremented by (+1) and updated to "05", and row number data "05" is displayed.

In addition, tax-included amount data "216" is displayed, and the symbol "TAX+" indicative of the tax-included amount is displayed. Further, the state flag of the state flag memory 22*f* is set to [tax-included amount display state of tax-included calculation] (step S26).

In this manner, when the numerical data (tax-included amount data) "216" was input and the [TAX–] (tax-excluded calculation: tax calculation 2) key 11*c* was operated, the tax-excluded calculation is executed and the tax-excluded amount data (tax calculation 2 result data) "200" and the symbol "TAX–" thereof are displayed. Subsequently, if the [TAX–] key 11*c* is operated, the tax amount data "16" and the symbol "TAX" thereof, and the tax-excluded amount data (tax calculation 2 result data) "200" and the symbol "TAX–" thereof, are switchedly displayed each time the [TAX–] key 11*c* is operated. Further, if the [TAX+] key 11*b* is operated, the display can be switched to the tax-included amount data "216" and the symbol "TAX+" thereof, Thus, the content of the tax calculation can easily be checked on the display unit 12 at hand.

Next, as illustrated in FIG. 10 part (A7), if the registered data check key ([▽] key 11*d*) is operated (step S44 (Yes)) in order to check the content of a series of calculation data corresponding to the tax-excluded calculation (tax calculation 2), the setting data of the calculation mode memory 22*c* is set to the check (verification) mode, and the symbol "REV" of the check mode is displayed on the display unit 12. In addition, the calculation operation data (numerical data (tax-included amount data) "216" and tax-excluded data (tax calculation 2 data) [TAX–]), which are registered in association with the first row number "01" of the calculation data memory 22*d*, are called, and displayed on the display unit 12 together with this row number "01" (step S45).

Here, as illustrated in FIG. 10 part (A8), if the [CORRECT] (correction) key 11*f* is operated (step S49 (Yes)) in order to correct the numerical data (tax-included amount data) "216" corresponding to the row number "01" which was displayed on the display unit 12 and checked, the setting data of the calculation mode memory 22*c* is set to the correction mode, and the symbol "CRT" of the correction mode is displayed on the display unit 12 (step S50).

Then, as illustrated in FIG. 10 part (A9), correct numerical data (tax-included data) "324" is input and displayed (step S51 (Yes)), S52). As illustrated in FIG. 10 part (A10), if the [CORRECT] (correction) key 11*f* is operated once again (step S53 (Yes)), the calculation operation data (numerical data (tax-included amount data)) "216", which is stored in the calculation data memory 22*d* in association with the current row number "01", is replaced with the input numerical data "324", and the numerical data "324" is registered (step S54) (see FIG. 4A, FIG. 4B). Then, the symbol "CRT" of the correction mode, which is displayed on the display unit 12, is deleted (step S55).

Thereafter, as illustrated in FIG. 10 part (A11) to FIG. 10 part (A13), if the registered data check key ([▽] key 11*d*) is repeatedly operated (step S46 (Yes)), it is confirmed, each time the registered data check key ([▽] key 11*d*) is operated, whether there is calculation data which is registered in the calculation data memory 22*d* in association with the next row number of the current row number, like the case of the print mode ON illustrated in FIG. 9 (step S47). If there is calculation data which is associated with the next row number (step S47 (Yes)), this calculation operation data is called, and displayed on the display unit 12 together with the next row number (step S48).

Specifically, as illustrated in FIG. 10 part (A11), if the registered data check key ([▽] key 11*d*) is operated once again (the second operation in the check mode), the display unit 12 displays tax-excluded amount data (tax calculation 2 result data) "300", which was obtained by the tax-excluded calculation (tax calculation) based on the calculation operation data after the correction registered in association with the row number "01" (numerical data (tax-included amount data) "324" and tax-excluded amount data [TAX–]), and also displays the symbol "TAX–" corresponding to the tax-excluded data [TAX–] that was called in association with the row number "02".

In addition, as illustrated in FIG. 10 part (A12), if the registered data check key ([▽] key 11*d*) is operated (the third operation), the display unit 12 displays tax amount data "24", which is the result of the tax-excluded calculation (tax calculation 2) based on the tax-excluded data [TAX–] registered in association with the row number "02", and also displays the symbol "TAX–" corresponding to the tax-excluded data [TAX–] that was called in association with the row number "03".

Further, as illustrated in FIG. 10 part (A13), if the registered data check key ([▽] key 11*d*) is operated (the fourth operation), the display unit 12 displays tax-excluded amount data (tax calculation 2 result data) "300", which is the result of the tax-excluded calculation (tax calculation) based on the tax-excluded data (tax calculation 2 data) [TAX–] registered in association with the row number "03", and also displays the symbol "TAX+" corresponding to the tax-included data [TAX+] that was called in association with the row number "04".

Thereby, like the first embodiment, even after a part of the series of calculation data calculated by the tax-excluded calculation (or tax-included calculation) was corrected, the tax-excluded amount data after the correction, tax amount data and tax-excluded amount data can easily be checked by repeatedly operating the registered data check key ([▽] key 11*d*/[△] key 11*e*).

Then, as illustrated in FIG. 10 part (A14), if the [REPRINT] (registered data print) key 11*g* is operated (step S56 (Yes)) in the state in which the tax-excluded amount data "300" corresponding to the calculation operation data (tax-included data [TAX+]) of the row number "04" is being displayed, the registered data print process illustrated in FIG. 8 is executed (step SP).

Specifically, if the registered data print process is started, like the first embodiment, the print unit 13 prints, on the recording sheet P, the registered data print start mark "• • • • 0 • • • •", which indicates the [CA] (Clear All) print in the reprint mode, as illustrated in FIG. 10 part (B) (step P1). Subsequently, the print unit 13 prints, on the recording sheet P, the numerical data (tax-included amount data) "324" and tax-excluded amount mark "+T"; tax rate data "8" and tax rate mark "%T"; tax amount data "24" and tax amount mark "T"; and tax-excluded amount data (tax calculation 2 result data) "300" and tax-excluded amount mark "–T" (step P1 to P4).

Thereby, like the first embodiment, even after a part of the series of calculation data calculated by the tax-excluded calculation (or tax-included calculation) was corrected, the tax-included amount data (+T), tax rate data (%T), tax amount data (T) and tax-excluded amount data (–T), which correspond to the result data of the tax-excluded calculation after the correction, can easily be printed on the recording sheet P by operating the [REPRINT] (registered data print) key 11*g*.

Since the registered data print start mark "• • • 0• • • •" is printed at the top of the recording sheet P, the user can confirm the print of the registered data after the correction corresponding to the operation of the [REPRINT] key 11g, by clearly distinguishing this print from the normal print "• • 0 • •" in the state of the print mode (ON).

In each of the above-described embodiments, the registered data print process (step S56 (Yes), SP) was described in the case where the [REPRINT] (registered data print) key 11g was operated in the state in which the check (verification) mode was set by the registered data check key ([∇] key 11d/[Δ] key 11e). However, also when the [REPRINT] (registered data print) key 11g was operated in the state in which the registration mode is set (step S57 (Yes)), the registered data print process illustrated in FIG. 8 is similarly executed (step SP).

Thus, according to the printer-equipped electronic calculator 10 with the above-described configuration, if the numerical data (tax-excluded amount or tax-included amount) is input and the tax calculation key ([TAX+] key or [TAX−] key) is operated, the display unit 12 displays the tax-included data (or tax-excluded data) which was calculated by performing the tax-included calculation (or tax-excluded calculation) for the input numerical data. Here, in the state of the print mode ON, the result data of the tax-included calculation (or tax-excluded calculation) is printed on the recording sheet P as the tax-excluded amount data (−T), tax rate data (%T), tax amount data (T) and tax-included amount data (+T). Thereafter, if the tax calculation key ([TAX+] key or [TAX−] key) is further operated, the tax-included data (or tax-excluded data) and the tax amount data, which are the result data of the tax-included calculation (or tax-excluded calculation), are switchedly displayed on the display unit 12, each time the tax calculation key is operated, without printing these data on the recording sheet P even in the state of the print mode ON.

Thereby, the content of the tax calculation can easily be checked, and the amount of print can be minimized and saved.

Additionally, according to the printer-equipped electronic calculator 10 with the above-described configuration, the input numerical data and the tax-included data (or tax-excluded data), which corresponds to the operation of the tax calculation key ([TAX+] (tax-included calculation) key or [TAX−] (tax-excluded calculation) key), are registered in the calculation data memory 22d as the calculation data which is associated with the successively updated row number data. Thereafter, if the registered data check key ([∇] key 11d or [Δ] key 11e) is operated, the registered calculation data is successively called, each time the registered data check key is operated, from the calculation data associated with the first (or last) row number data, and the tax-included amount data (or tax-excluded amount data) and tax amount data, which correspond to the called calculation data, are successively displayed. Then, if the [REPRINT] (registered data print) key 11g is operated, the tax-excluded amount data (−T), tax rate data (%T), tax amount data (T) and tax-included amount data (+T), which are the result data of the tax-included calculation (or tax-excluded calculation) for the registered calculation data, are printed on the recording sheet P.

Thereby, in the state of the print mode OFF, the result data (tax-excluded amount data (−T)/tax rate data (%T)/tax amount data (T)/tax-included amount data (+T)) of the tax-included calculation (or tax-excluded calculation), which corresponds to the input of the numerical data (tax-excluded amount or tax-included amount) and the operation of the tax calculation key ([TAX+] key or [TAX−] key), is not printed on the recording sheet P. Then, after the tax-included amount data (or tax-excluded amount data) is checked by operating the registered data check key ([∇] key 11d or [Δ] key 11e), the tax-excluded amount data (−T), tax rate data (%T), tax amount data (T) and tax-included amount data (+T) can be printed on the recording sheet P by operating the [REPRINT] (registered data print) key 11g. Thus, the content of the tax calculation can easily be checked, and the amount of print can be minimized and saved.

Additionally, according to the printer-equipped electronic calculator 10 with the above-described configuration, the tax-included amount data (or tax-excluded amount data) and tax amount data, which correspond to the calculation data called from the calculation data memory 22d, are displayed by operating the registered data check key ([∇] key 11d or [Δ] key 11e). In this state, if the [CORRECT] (correction) key 11f is operated, the calculation mode transitions to the correction mode, and the numerical data of the displayed tax-included amount data (or tax-excluded amount data) can be corrected. Thereafter, if the [REPRINT] (registered data print) key 11g is operated, the tax-excluded amount data (−T), tax rate data (%T), tax amount data (T) and tax-included amount data (+T), which correspond to the corrected numerical data, are printed on the recording sheet P. Thus, the content of the tax calculation can easily be checked and corrected, and the amount of print can be minimized and saved.

In the meantime, the methods of the respective processes by the printer-equipped electronic calculator 10, which has been described in each of the embodiments, that is, the respective methods of the calculation data print process illustrated in the flowcharts of FIG. 5 to FIG. 7 and the registered data print process illustrated in the flowchart of FIG. 8, can all be stored as computer-executable programs in a medium of an external storage device, such as a memory card (ROM card, RAM card, etc.), a magnetic disk (floppy (trademark) disk, hard disk, etc.), an optical disc (CD-ROM, DVD, etc.), or a semiconductor memory, and can be distributed. In addition, the computer (CPU) of the electronic calculator including the print function reads the program, which is stored in the medium of the external storage device, into the storage device, and the operation is controlled by this read-in program. Thereby, it is possible to realize the calculation data print function, which has been described in each of the embodiments, and to execute the same processes by the above-described methods.

In addition, the data of the program for realizing each of the above-described methods can be transmitted on a communication network (N) in the form of a program code, and the data of the program can be taken in the electronic calculator including the print function from a computer apparatus (program server) connected to this communication network (N), and stored in the storage device, thereby realizing the above-described calculation data print function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tax calculation apparatus comprising a display, a printer, a plurality of keys including a print designation key and a tax designation key, and a processor, the processor being configured to execute processes of:

judging whether a print mode is set in response to a user operation on one of the plurality of keys other than the print designation key;

inputting numerical data in accordance with a user operation on at least one of the plurality of keys after the judging;

accepting a tax operation by a user on the tax designation key;

deriving tax calculation result data by executing a calculation based on the numerical data, in response to the input of the numerical data and the acceptance of a first tax operation as the tax operation on the tax designation key, causing the display to display the tax calculation result data, and causing the printer to automatically print tax calculation print data including the tax calculation result data and tax amount data corresponding to the tax calculation result data without a user operation on the print designation key if the print mode is set; and causing the display to shift from the displaying of the tax calculation result data to displaying of the tax amount data, and preventing the printer from printing the tax calculation print data again when a second tax operation on the tax designation key is performed after the first tax operation, even if the print mode is set.

2. The tax calculation apparatus of claim 1, wherein the processor is configured to execute:

a process of setting the print mode or a non-print mode in accordance with a user operation, and the process of causing the printer to automatically print the tax calculation print data if the print mode is set, and preventing the printer form printing the tax calculation print data if the non-print mode is set.

3. The tax calculation apparatus of claim 1, wherein the processor is configured to execute processes of:

registering, as calculation operation data, the input numerical data and tax calculation data corresponding to the accepted tax operation;

accepting a check operation in accordance with a user operation;

causing the display to display the tax calculation result data or the tax amount data, based on the registered calculation operation data, if the check operation is accepted;

accepting a print designation operation in accordance with a user operation on the print designation key; and causing the printer to print tax calculation print data including the tax calculation result data and the tax amount data, based on the registered calculation operation data, if the print designation operation is accepted.

4. The tax calculation apparatus of claim 3, wherein the processor is configured to execute a process of correcting, in accordance with a user operation, the numerical data of the registered calculation operation data, and the process of causing the printer to print the tax calculation print data based on the registered calculation operation data includes printing, if the print designation operation is accepted after the numerical data was corrected, tax calculation print data including the corrected numerical data, tax calculation result data calculated based on the calculation operation data of the tax calculation data corresponding to the accepted tax operation, and tax amount data corresponding to the tax calculation result data.

5. The tax calculation apparatus of claim 3, wherein the process of causing the printer to print the tax calculation print data based on the registered calculation operation data includes printing the tax calculation print data by adding a mark indicative of a print start of registered data, if the print designation operation is accepted.

6. A tax calculation method of a tax calculation apparatus comprising a display, a plurality of keys including a print designation key and a tax designation key, and a printer, the method comprising:

inputting numerical data in accordance with a user operation;

judging whether a print mode is set in response to a user operation on one of the plurality of keys except the print designation key;

accepting a tax operation by a user on the tax designation key;

deriving tax calculation result data by executing a calculation based on the numerical data, in response to the input of the numerical data and the acceptance of a first tax operation as the tax operation on the tax designation key, causing the display to display the tax calculation result data, and causing the printer to automatically print tax calculation print data including the tax calculation result data and tax amount data corresponding to the tax calculation result data without a user operation on the print designation key if the print mode is set; and causing the display to shift from the displaying of the tax calculation result data to displaying of the tax amount data, and preventing the printer from printing the tax calculation print data again when a second tax operation with the tax designation key is performed after the first tax operation, even if the print mode is set.

7. The tax calculation method of claim 6, further comprising setting the print mode or a non-print mode in accordance with a user operation, wherein the printer is prevented from printing the tax calculation print data if the non-print mode is set.

8. The tax calculation method of claim 6, further comprising:

registering, as calculation operation data, the input numerical data and tax calculation data corresponding to the accepted tax operation;

accepting a check operation in accordance with a user operation;

causing the display to display the tax calculation result data or the tax amount data, based on the registered calculation operation data, if the check operation is accepted;

accepting a print designation operation in accordance with a user operation on the print designation key; and causing the printer to print tax calculation print data including the tax calculation result data and the tax amount data, based on the registered calculation operation data, if the print designation operation is accepted.

9. The tax calculation method of claim 8, further comprising:

correcting, in accordance with a user operation, the numerical data of the registered calculation operation data, wherein said causing the printer to print the tax calculation print data based on the registered calculation operation data includes printing, if the print designation operation is accepted after the numerical data was corrected, tax calculation print data including the corrected numerical data, tax calculation result data calculated based on the calculation operation data of the tax calculation data corresponding to the accepted tax operation, and tax amount data corresponding to the tax calculation result data.

10. The tax calculation method of claim 8, wherein said causing the printer to print the tax calculation print data based on the registered calculation operation data includes printing the tax calculation print data by adding a mark indicative of a print start of registered data, if the print designation operation is accepted.

11. A computer-readable non-transitory storage medium which stores a program for causing a computer comprising a display, a plurality of keys including a print designation key and a tax designation key, and a printer, to execute processes of:

inputting numerical data in accordance with a user operation;

judging whether a print mode is set in response to a user operation on one of the plurality of keys except the print designation key;

accepting a tax operation by a user on the tax designation key;

deriving tax calculation result data by executing a calculation based on the numerical data, in response to the input of the numerical data and the acceptance of a first tax operation as the tax operation on the tax designation key, causing the display to display the tax calculation result data, and causing the printer to automatically print tax calculation print data including the tax calculation result data and tax amount data corresponding to the tax calculation result data without a user operation on the print designation key if the print mode is set; and causing the display to shift from the displaying of the tax calculation result data to displaying of the tax amount data, and preventing the printer from printing the tax calculation print data again when a second tax operation on the tax designation key is performed after the first tax operation, even if the print mode is set.

12. The storage medium of claim 11, wherein the program causes the computer to execute a process of setting the print mode or a non-print mode in accordance with a user operation, wherein the printer is prevented from printing the tax calculation print data if the non-print mode is set.

13. The storage medium of claim 11, wherein the program causes the computer to execute processes of:

registering, as calculation operation data, the input numerical data and tax calculation data corresponding to the accepted tax operation;

accepting a check operation in accordance with a user operation;

causing the display to display the tax calculation result data or the tax amount data, based on the registered calculation operation data, if the check operation is accepted;

accepting a print designation operation in accordance with a user operation on the print designation key; and causing the printer to print tax calculation print data including the tax calculation result data and the tax amount data, based on the registered calculation operation data, if the print operation is accepted.

14. The storage medium of claim 13, wherein the program causes the computer to execute a process of correcting, in accordance with a user operation, the numerical data of the registered calculation operation data, wherein said causing the printer to print the tax calculation print data based on the registered calculation operation data includes printing, if the print designation operation is accepted after the numerical data was corrected, tax calculation print data including the corrected numerical data, tax calculation result data calculated based on the calculation operation data of the tax calculation data corresponding to the accepted tax operation, and tax amount data corresponding to the tax calculation result data.

15. The storage medium of claim 13, wherein said causing the printer to print the tax calculation print data based on the registered calculation operation data includes printing the tax calculation print data by adding a mark indicative of a print start of registered data, if the print designation operation is accepted.

* * * * *